C. P. BROWN.
DEVICE FOR APPLYING EDGE-TOOLS TO SHARPENERS

No. 193,748. Patented July 31, 1877.

Witnesses
George W. Clark
Harry B. Hayes

Curtis P. Brown  Inventor
By Howard Bros,
his Attorneys

UNITED STATES PATENT OFFICE.

CURTIS P. BROWN, OF WHEELING, WEST VIRGINIA.

IMPROVEMENT IN DEVICES FOR APPLYING EDGE-TOOLS TO SHARPENERS.

Specification forming part of Letters Patent No. 193,718, dated July 31, 1877; application filed May 24, 1877.

*To all whom it may concern:*

Be it known that I, CURTIS P. BROWN, of the city of Wheeling, county of Ohio, State of West Virginia, have invented a new and useful Machine for Holding and Sharpening Edge-Tools; and I hereby declare the following to be a full, clear, and explicit description of the same, reference being had to the accompanying drawings, forming part of this specification.

My invention relates specially to a device or machine for holding and sharpening small edge-tools—such as gravers used by wood and steel engravers, silversmiths, &c.—to any bevel required, either acute or obtuse, on the cutting-edge; and it consists of an adjustable chuck or tool-holder, journaled into the side pieces of a movable frame or carriage operating on rollers, and provided with a bevel-indicating dial in connection with the frame, by means of which the tool is inclined at any desired angle with the grinding or frictional surface upon which the machine is placed, the tool being sharpened by simply moving the carriage backward and forward upon the surface of a flat whetstone after the tool has been properly adjusted and secured in the chuck or tool-holder.

In order that those who are skilled in the art to which my invention appertains may make and use the same, I will now proceed to more fully explain its construction and mode of operation, reference being had to the drawings, in which—

Figure 1:
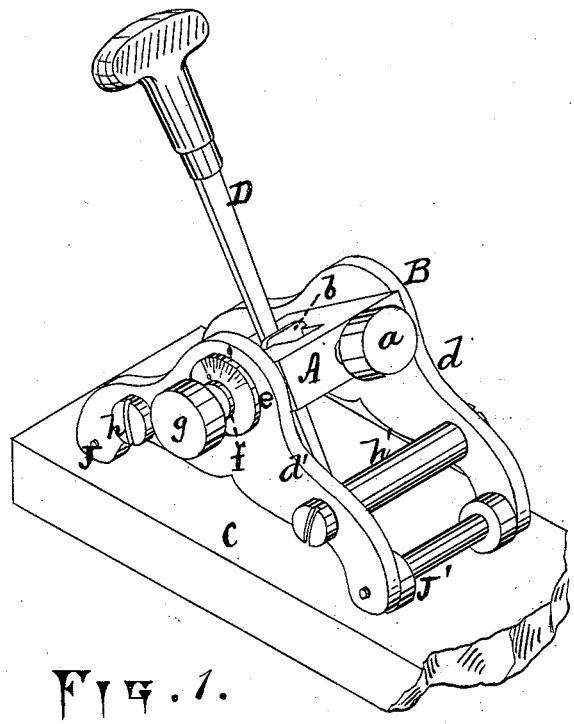
Figure 2:
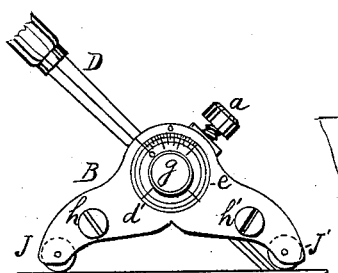
Figure 3:
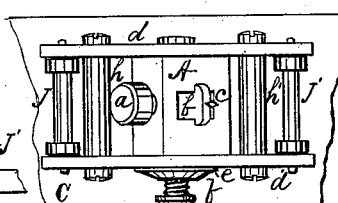
Figure 4:
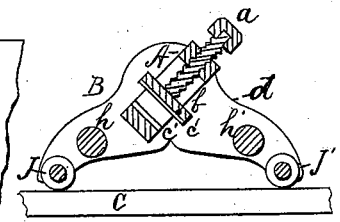

Figure 1 is a perspective view of my invention; Fig. 2, a side view; Fig. 3, a top view; Fig. 4, a vertical central section.

In the drawings like letters of reference refer to like parts.

The letter A designates the chuck or tool-holder, constructed with an oblong tool-slot of suitable size, having a V-shaped groove or channel, C, through the center of the lower end. *b* is a shouldered clamping-plate, having a corresponding V-shaped channel, C', through the center of the side next the one in the end of the tool-slot. *a* is a thumb-screw for the purpose of holding the tool firmly in the chuck. The chuck A is journaled into the side pieces *d d'* of the carriage B, one journal extending through the side plate sufficiently to receive a dial-disk, *e*, which turns with the journal, and indicates the angle of inclination of the chuck with the horizontal plane of the carriage. *f* is a washer bearing against the dial-disk. *g* is a set-screw working in the axle of the chuck A, by means of which the chuck is held stationary in any position to which it is turned or inclined.

To secure the chuck in any desired position, by turning the screw *g* it is driven up into the journal of the chuck, carrying with it the washer *b*, which is caused to impinge tightly against the dial *e* and face of the journal of the chuck, thus firmly clamping the parts together and the chuck in place.

*h h'* are frame-rods to support sides *d d'* of carriage. J J' are rollers, pivoted with adjustable bearings to the ends of the sides *d d'*, to prevent the wear of the side pieces of the carriage on the whetstone C, upon which the machine is operated. D represents a graver, placed in the machine ready for operation.

The machine is used in connection with an oil-stone or hone, or other flat grinding-surface, upon which the carriage is placed. The chuck A is set to the degree of inclination required to bevel the cutting edge or point to the angle desired on the graver by means of the graduated dial *e*, and it is then made fast with the set-screw *g*. The tool or graver to be sharpened is then placed in the chuck A, with the edge or point extending down to the whetstone C, and sufficiently below the bearing-plane of the rollers in the carriage to whet or grind the tool as desired. It is then secured in the chuck A by means of the thumb-screw *a*, and is then ready for the operation of sharpening, which is performed by moving the carriage to and fro over the surface of the whetstone until the desired pitch and degree of sharpness are attained.

By means of the V-shaped channel or grooves C C' any triangular or diamond-shaped graver can be introduced in the chuck A. The corners of the handle or blade, fitting in the grooves, permits the same to be held firmly by the set-screw.

Having described my invention, what I claim, and desire to secure by Letters Patent, is—

1. The chuck A, journaled in the side frames of the machine so as to turn or revolve therein, and constructed with a central opening or slot to receive the tool to be sharpened, shouldered clamping-plate $b$, playing in the central opening, and thumb-screw $a$, as and for the purposes described.

2. The chuck A, journaled in the side frames of the machine, and provided on one end of its journal with a dial-plate, $e$, which revolves or turns with the chuck, as and for the purposes described.

3. In combination with the revolving chuck A and dial-plate $e$ on its journal, the clamping-screw $g$ and washer $f$, as and for the purposes described.

4. In combination with the revolving or turning chuck A, the frame or carriage composed of side rails or supports $d$ $d'$, braces $h$ $h'$, and rollers J J', substantially as and for the purpose described.

5. In a machine for holding and sharpening edge-tools, the combination of the adjustable chuck A, clamping-plate $b$, having the V-shaped grooves C C', thumb-screw $a$, dial $e$, washer $f$, thumb-screw $g$, side supports $d$ $d'$, rods $h$ $h'$, rollers J J', substantially as herein shown, and for the purpose set forth.

CURTIS P. BROWN.

Witnesses:
CY. BATES HOWARD,
R. G. BARR.